United States Patent
Tateishi et al.

[19]

[11] Patent Number: 5,859,818
[45] Date of Patent: Jan. 12, 1999

[54] TILT SERVO APPARATUS FOR USE IN OPTICAL DISC REPRODUCING APPARATUS

[75] Inventors: Kiyoshi Tateishi; Sakashi Ohtaki; Noriaki Murao, all of Tsurugashima, Japan

[73] Assignee: Pioneer Electronic Corporation, Tokyo, Japan

[21] Appl. No.: 899,334

[22] Filed: Jul. 23, 1997

[30] Foreign Application Priority Data

Sep. 3, 1996 [JP] Japan ..................................... 8-252287

[51] Int. Cl.[6] ....................................................... G11B 7/00
[52] U.S. Cl. ...................................... 369/44.32; 369/112
[58] Field of Search ............................. 369/44.32, 44.23, 369/44.24, 112

[56] References Cited

U.S. PATENT DOCUMENTS

| | | | |
|---|---|---|---|
| 5,301,175 | 4/1994 | Nakamura | 369/44.32 |
| 5,388,105 | 2/1995 | Takagi et al. | 369/44.32 |
| 5,430,699 | 7/1995 | Matsubara et al. | 369/44.32 |
| 5,442,615 | 8/1995 | Ohsato et al. | 369/44.32 |
| 5,515,348 | 5/1996 | Ohsato | 369/44.32 |
| 5,657,303 | 8/1997 | Namoto et al. | 369/44.32 |
| 5,699,340 | 12/1995 | Lee et al. | 369/44.32 |
| 5,742,578 | 11/1995 | Kumai et al. | 369/44.32 |

*Primary Examiner*—Nabil Hindi
*Attorney, Agent, or Firm*—Fish & Richardson P.C.

[57] ABSTRACT

A tilt servo apparatus in an optical disc reproducing apparatus operates promptly and certainly when reading recording information of an optical disc recorded at high density. The tilt servo apparatus is used in an optical disc reproducing apparatus having an optical pickup including a liquid crystal panel for an aberration correction on which a transparent electrode is formed and divided into segments of predetermined shapes, and irradiating a laser beam via the liquid crystal panel for the aberration correction and the objective lens, and receiving an obtained reflection light. The tilt servo apparatus has: tilt detecting for detecting a signal corresponding to a tilting angle in a radial direction between the information recording surface of the optical disc and an optical axis of the objective lens; and a driving circuit for variably driving voltages which are applied to the divided portions of the liquid crystal panel, respectively. The driving circuit drives so that predetermined voltages are applied to the respective divided segments of the liquid crystal panel according to a detection output of the tilt detecting and a phase difference between respective laser beams passing through the divided portions is adjusted, thereby correcting the aberration of the objective lens inclined at the tilting angle relative to the information recording surface of the optical disc.

2 Claims, 10 Drawing Sheets

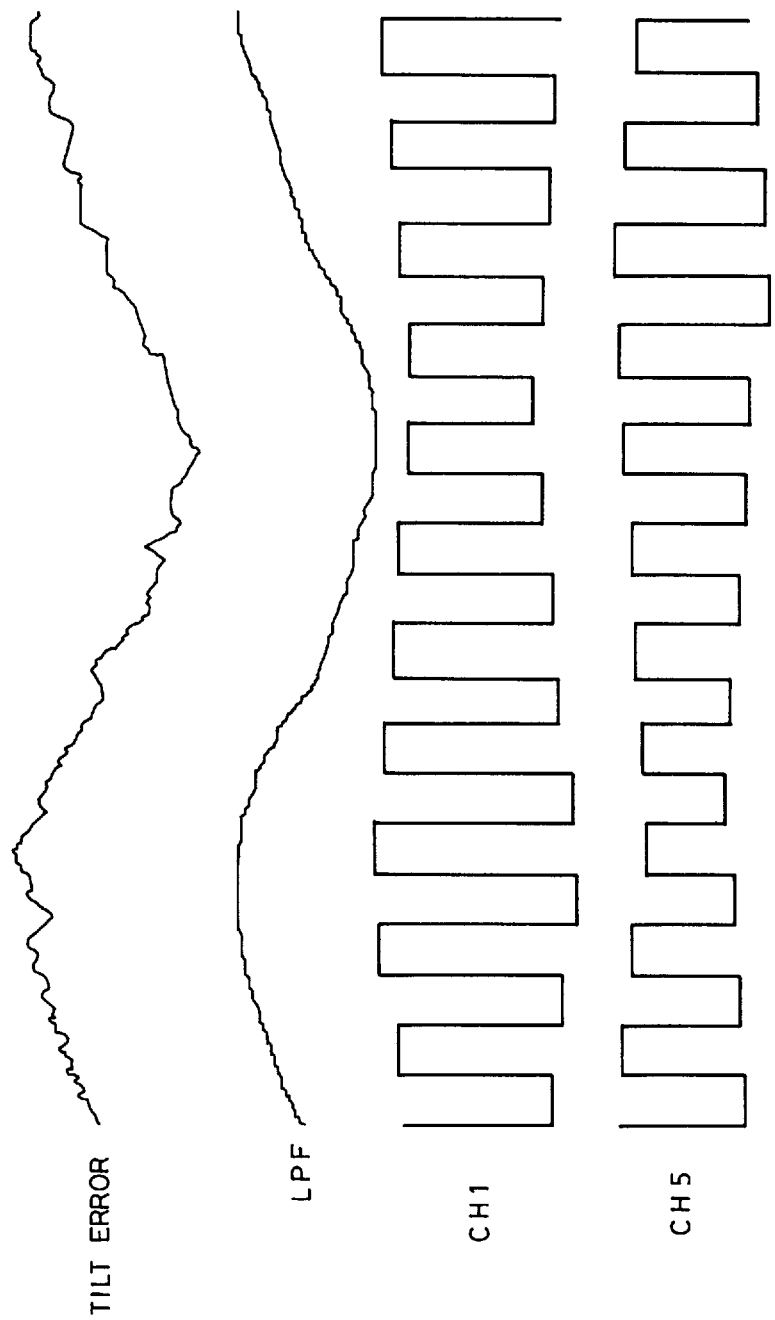

TILT SERVO APPARATUS FOR USE IN OPTICAL DISC REPRODUCING APPARATUS

BACKGROUND OF THE INVENTION

1. Field of the Invention

The present invention relates to a tilt servo apparatus for use in a reproducing apparatus of an optical disc or the like which controls a tilt of an information recording surface of the optical disc relative to an optical axis of an optical pickup when reading recording information from the optical disc or the like.

2. Description of Related Art

Hitherto, in order to correct a tilt in the radial direction of an information recording surface caused by a curvature or a self weight of an optical disc, a reproducing apparatus of an optical disc such as a laser disc or the like is provided with a tilt servo apparatus. More particularly, as shown in FIG. 1, a tilt sensor which comprises a light emitting diode, photo-detector elements provided on both sides of the light emitting diode along the disc's radial direction, and the like is provided for an optical pickup for reading information. A light emitted from the light emitting diode enters an information recording surface of the optical disc being rotating. Reflection light beams are received by the photodetector elements, respectively. A tilt error signal is formed on the basis of electric signals obtained by the photo detector elements. A tilt motor is properly driven in accordance with a magnitude of the tilt error signal, thereby inclining the whole optical pickup along the radial direction together with a guide rail to support the optical pickup so as to be movable in the radial direction, thereby performing a tilt correction.

On the other hand, a DVD (digital video disc or digital versatile disc) as an optical disc on which a large quantity of digital information can be recorded has been proposed in recent years in association with diversification of the kind of information and a demand for reproducing apparatuses which can accurately reproduce the recording information on the DVD is increasing. With the DVD, digital information such as motion pictures, computer information, or the like can be recorded on a disc having the same diameter of 12 cm as that of a CD (compact disc) at a recording density that is six to eight times as high as that of the CD.

As described above, since a considerably high density recording is performed on the DVD as compared with the CD or the Laser Disc, it is necessary to set a spot diameter of a laser beam to a value which is extremely smaller than that of the CD or laser disc in order to read pit information. The spot diameter of the laser beam is proportional to a wavelength $\lambda$ of a laser beam which is used and is inversely proportional to a numerical aperture NA of an objective lens.

Therefore, in the optical pickup which is used for the reproducing apparatus of the DVD, it is necessary to use a laser light source of a short wavelength $\lambda$ and an objective lens of a large numerical aperture NA as compared with those of a conventional optical pickup which is used for a conventional reproducing apparatus of the CD or laser disc.

When the wavelength $\lambda$ of the laser beam is shortened and the numerical aperture NA of the objective lens is increased for the DVD, however, a wavefront aberration (mainly, coma aberration) occurs even if the disc is slightly inclined and an angle of a disc surface deviated from the surface perpendicular to an optical axis of the optical pickup, what is called a margin for a tilting angle is reduced. When the recording information is read, therefore, it is necessary to correct the tilt more frequently as compared with the CD or laser disc.

As described above, with the reproducing apparatus of the DVD, there is a need for a tilt servo apparatus having a response time shorter than that of a conventional apparatus. Since the conventional tilt servo apparatus shown in FIG. 1 is based on the mechanical control by the driving of the tilt motor as mentioned above, the use of a large complicated mechanism is necessary, so that there are problems that the size of the apparatus as a whole as well as its cost increases, a response time against the control operation is limited (about 1 Hz), and the tilt servo may not always be operated certainly. There consequently is also a limit in reduction of a search time when searching the recording information by the optical pickup.

OBJECTS AND SUMMARY OF THE INVENTION

The invention has been made in view of the above-described problems and it is an object of the invention to provide a tilt servo apparatus which can promptly and certainly operate when recording information on an optical disc which has been recorded at a high density is read in an optical reproducing apparatus.

According to the first aspect of the invention, there is provided a tilt servo apparatus for use in an optical disc reproducing apparatus having an optical pickup which comprises at least a laser light source, an objective lens, a liquid crystal panel for an aberration correction on which a transparent electrode is divided in predetermined shapes and formed, and a photodetector element, and which irradiates a laser beam emitted from the laser light source onto an information recording surface of an optical disc via the liquid crystal panel for the aberration correction and the objective lens, thereby forming a light spot, and receives, at the photodetector element, a reflection light being obtained, thereby reading a signal corresponding to information to be recorded on the optical disc, the tilt servo apparatus comprising: tilt detecting means for detecting a signal corresponding to a tilting angle in a radial direction between the information recording surface of the optical disc and an optical axis of the objective lens; and a driving circuit for variably driving voltages applied to the divided segments of the liquid crystal panel, respectively, the driving circuit performing a driving operation in which predetermined voltages are applied to the respective divided segments of the liquid crystal panel in accordance with a detection output of the tilt detecting means and a phase difference between respective laser beams passing through the divided portions is adjusted, thereby correcting an aberration of the objective lens inclined at the tilting angle with respect to the information recording surface of the optical disc.

According to a second aspect of the invention, in the tilt servo apparatus for use in the optical disc reproducing apparatus, the driving circuit includes at least a plurality of nonlinear circuits and voltages applied to parts of the divided segments of the liquid crystal panel are variably driven via the at least one nonlinear circuit.

Since the apparatus according to the invention is constructed as mentioned above, the signal corresponding to the tilting angle in the radial direction between the information recording surface of the optical disc and the optical axis of the objective lens is detected by the tilt detecting means. When the applied voltages to the divided portions are adjusted in correspondence to the obtained detection output so as to reduce the phase difference of the laser beams passing through the respective divided portions of the liquid crystal panel, among the divided portions a divided portion, in which the phase difference characteristics for the applied voltage are nonlinear, is variably driven by performing a process of obtaining linear characteristics via the one or plurality of nonlinear circuits included in the driving circuit, thereby enabling the operation to correct the aberration of the objective lens which is inclined at the tilting angle to be promptly and certainly executed.

BRIEF DESCRIPTION OF THE DRAWINGS

FIG. 10 is a diagram showing an example of waveforms of driving outputs of regions $P_1$ and $P_5$ in the liquid crystal panel which are generated from the liquid crystal panel driving circuit in the tilt servo apparatus according to the embodiment of the invention.

DETAILED DESCRIPTION OF THE PREFERRED EMBODIMENT

Figure 1:
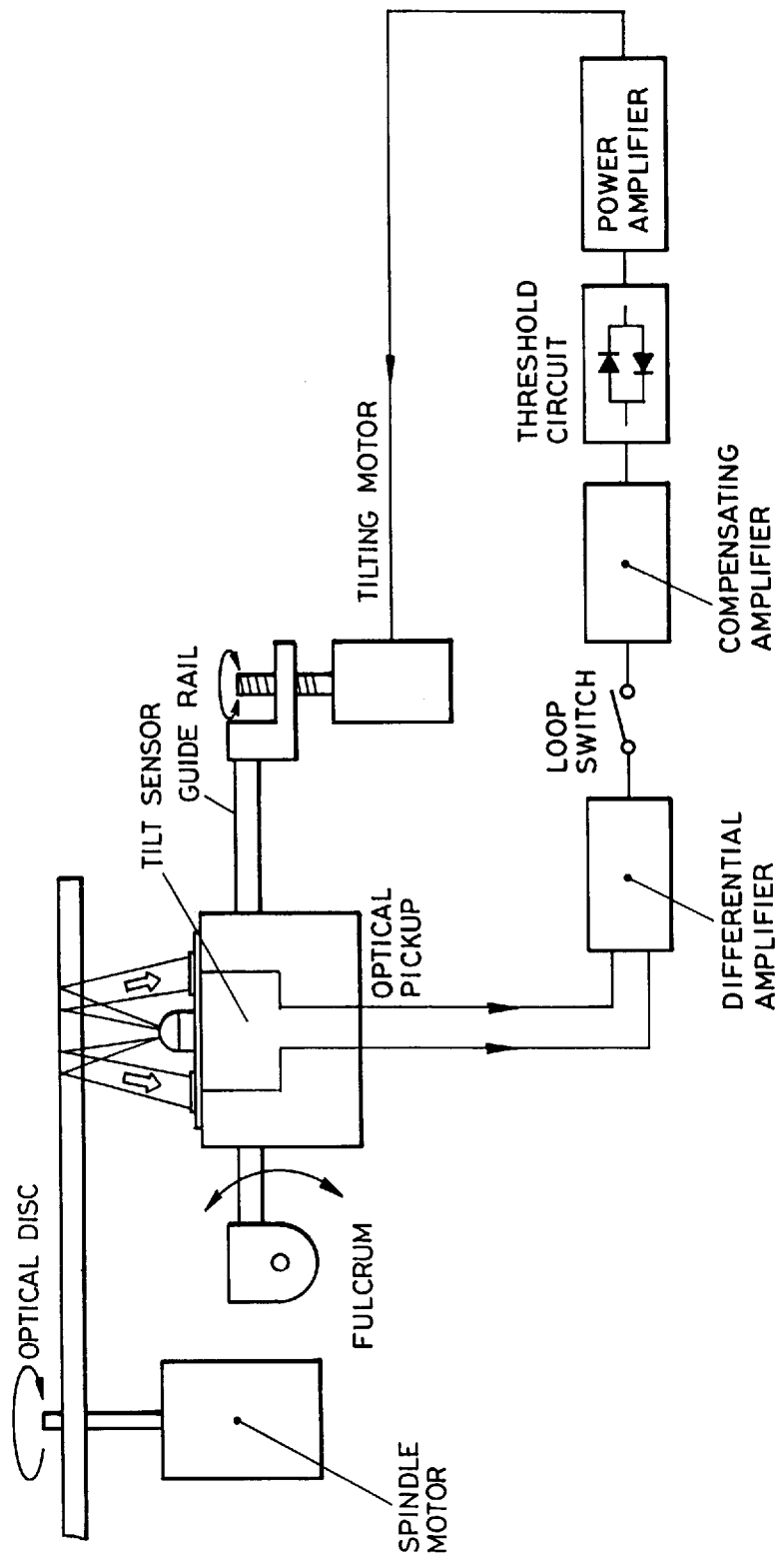
FIG. 1 is a block diagram of a construction of a tilt servo apparatus which is used for a conventional optical disc reproducing apparatus.
Figure 2:
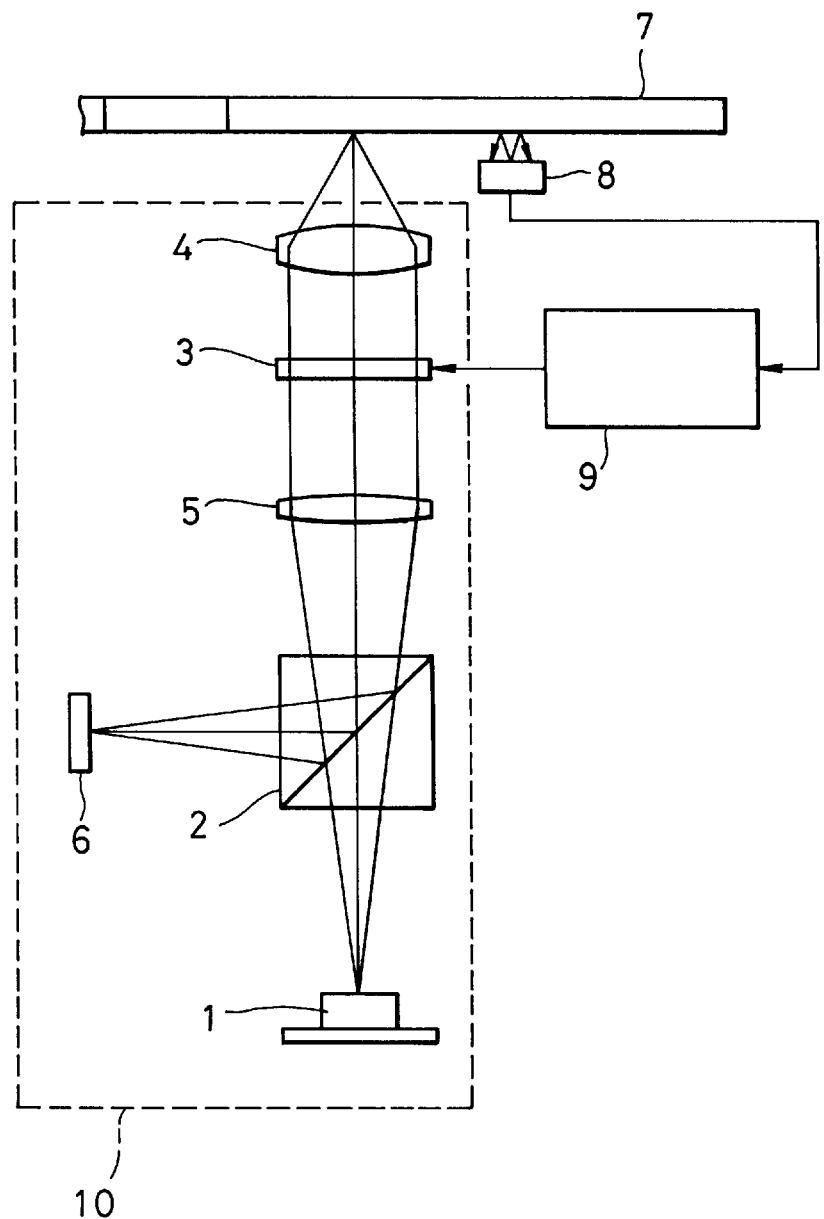
FIG. 2 is a block diagram showing a construction of an embodiment of the tilt servo apparatus according the invention used in an optical disc reproducing apparatus.

A preferred embodiment of the invention will now be described below. FIG. 2 is a block diagram showing a construction of a tilt servo apparatus which is used for an optical disc reproducing apparatus according to an embodiment of the invention. In the diagram, reference numeral 10 denotes an optical pickup having a laser light source 1, a half prism 2, a liquid crystal panel 3, an objective lens 4, a collimator lens 5, and a photodetector 6. Reference numeral 7 denotes an optical disc; 8 a tilt sensor; and 9 a liquid crystal panel driving circuit.

A laser beam emitted from the laser light source 1 passes through the half prism 2 and is converted into a parallel light by the collimator lens 5 after that. The parallel light passes through the liquid crystal panel 3, is converged by the objective lens 4, enters an information recording surface, in the perpendicular direction, of the optical disc 7 rotating at a predetermined speed, and is focused, thereby forming a light spot on the information recording surface. Pits which hold information are arranged and formed concentrically or spirally on the information recording surface of the optical disc 7 and the pits form tracks to be scanned by the rotation of the disc.

The optical pickup 10 produces a reflection light modulated according to a pit shape of the pit being scanned, by focusing the light spot and rendering the light spot tracking the track by means of a focusing servo apparatus, a tracking servo apparatus and the like (not shown). The generated reflection light again passes through the objective lens 4, liquid crystal panel 3, and collimator lens 5 and is reflected by the mirror surface of the half prism 2, thereby forming an image onto the photodetector 6.

As mentioned above, the optical pickup 10 receives the laser beam from the objective lens 4 in the perpendicular optical axial direction and reads the information held in the pits on the rotating optical disc 7.

On the other hand, the rotating optical disc 7 may not be necessarily loaded so that its surface is maintained in the horizontal direction. For example, there is a case such that the optical axis of the optical pickup 10 is inclined from a perpendicular direction of the information recording surface of the optical disc 7 during the rotation due to a curvature, a deformation, a resonance by a disturbance, and the like as factors, so that a wavefront aberration (mainly, coma aberration) occurs. The tilt sensor 8 is, therefore, provided near the optical axis of the optical pickup 10 in order to detect a tilt in the radial direction of the optical disc 7. A tilt error signal obtained is transmitted to the liquid crystal panel driving circuit 9. The liquid crystal panel driving circuit 9 adjusts a phase difference of the liquid crystal panel 3 in accordance with the tilt error signal being supplied, thereby correcting the tilt.

Figure 3:
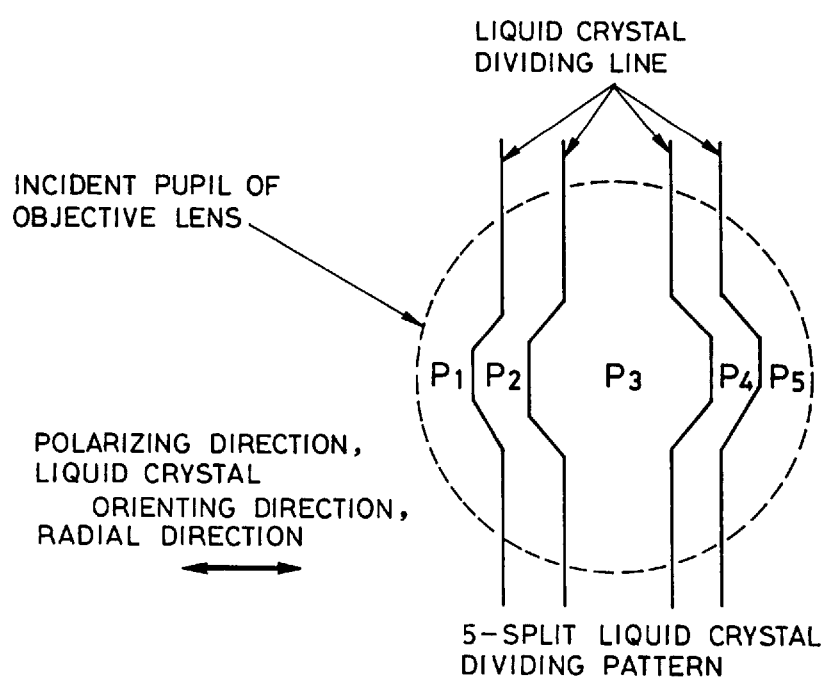
FIG. 3 is a diagram showing an arrangement of a dividing pattern of a liquid crystal panel provided for an optical pickup of the embodiment of the tilt servo apparatus according to the invention.

In the liquid crystal panel 3, the application voltage can be respectively driven in a plurality of regions obtained by dividing a transparent electrode, respectively. As shown in FIG. 3, the dividing shape is so constructed that it includes a plurality of pairs of regions which are symmetrical with respect to the optical axis of the pupil of the corresponding objective lens 4 along the radial direction of the optical disc 7 in which the tilt is made operative. Each of the divided regions is driven by a driving output corresponding to each region by the liquid crystal panel driving circuit 9. The orienting direction of the liquid crystal is substantially the same as the polarizing direction of the light entering from the laser light source 1 and is arranged in a pattern so that it is along the radial direction of the optical disc 7.

Although the dividing pattern of the liquid crystal panel 3 is shown as a pattern formed by dividing the pupil of the objective lens 4 into five portions (regions $P_1$ to $P_5$ in FIG. 3) in FIG. 3, the dividing pattern is not limited to that of the example. For example, a simple strap shape can be also used. The number of divided portions is not limited to five but the liquid crystal panel 3 can be also divided into a plurality of regions other than five regions.

Figure 4:
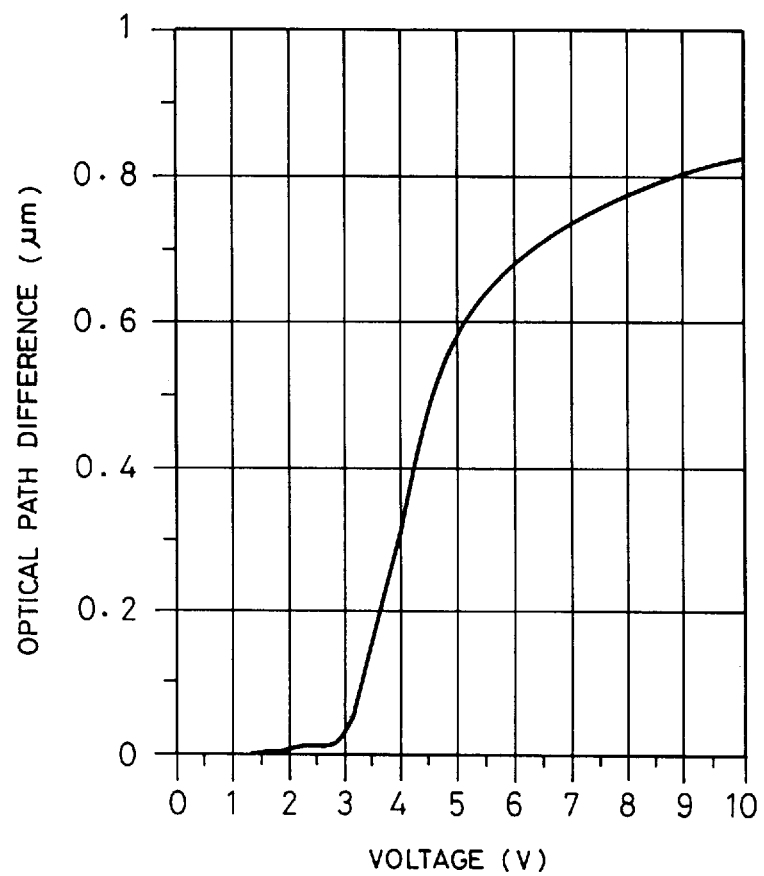
FIG. 4 is a diagram showing characteristics of an optical path difference (or a phase difference) obtained when an orienting direction of liquid crystal which is used for the liquid crystal panel provided for the optical pickup of the tilt servo apparatus according to the embodiment of the invention and a polarizing direction of a light entering from a laser light source 1 coincide.

FIG. 4 shows characteristics of an optical path difference (or phase difference) obtained when the orienting direction of the liquid crystal which is used for the liquid crystal panel 3 and the polarizing direction of the light entering from the laser light source 1 are made coincided. An axis of abscissa shows a voltage applied to the liquid crystal and an axis of ordinate indicates the optical path difference (or phase difference). As will be understood from the diagram, although the phase difference obtained rises from a point near 3V and almost linearly changes up to a point near 5V, it changes non-linearly so as to saturate at voltages exceeding 5V. Although the liquid crystal which is used for the liquid crystal panel 3 in the invention has characteristics shown in FIG. 4, the liquid crystal usually has the above nonlinear characteristics.

The liquid crystal panel 3 is arranged as mentioned above. When the optical disc 7 is inclined, the liquid crystal driving circuit 9 drives the liquid crystal panel 3 so that the applied voltages to the divided regions of the liquid crystal panel 3 have the phase difference corresponding to the wavefront aberration which occurs. The aberration of the objective lens 4 is corrected by reducing the phase difference of the laser beams passing through the divided regions.

Figure 5:
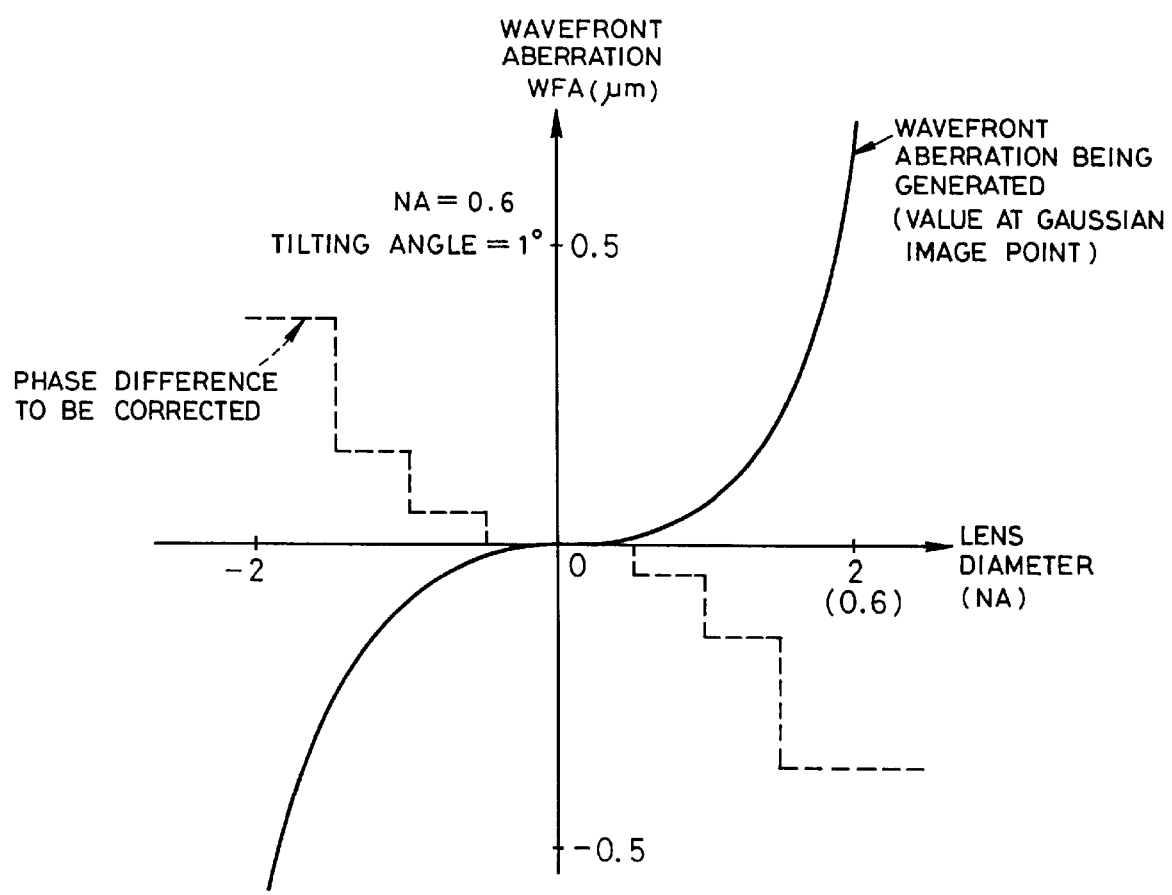
FIG. 5 is a diagram showing an example of a wavefront aberration (mainly, coma aberration) occurring when an optical disc 7 is inclined at a tilting angle of 1°.

FIG. 5 shows an example of the wavefront aberration (mainly coma aberration) occurring, for example, when the optical disc 7 is inclined by a tilting angle of 1°. In this case, by giving a phase difference as shown by a broken line in accordance with each of the divided regions of the liquid crystal panel 3, the wavefront aberration due to the tilt is cancelled and the phase difference between the divided regions can be reduced.

According to the embodiment, therefore, in order to correct the tilt, positive and negative phase differences for the phase around the center of the objective lens 4 are given to each of the divided regions of the liquid crystal panel 3 by the liquid crystal panel driving circuit 9. With respect to the divided regions ($P_1$ to $P_5$) of the liquid crystal panel 3 of FIG. 3, for the phase of the region $P_3$ existing at the center of the objective lens 4, in the regions $P_1$ and $P_2$ and to the regions $P_3$ and $P_4$, for example, a voltage which is applied to the region $P_3$ is fixed to 4.5V, a voltage lower than 4.5V is applied to the regions $P_1$ and $P_2$, and a voltage higher than 4.5V is applied to the regions $P_4$ and $P_5$, so that the tilt correction can be performed. When the positive or negative direction of the tilt is reversed, the operating conditions are also changed. The voltage which is applied to the regions $P_1$ and $P_2$ is set to a value higher than 4.5V and the voltage which is applied to the regions $P_4$ and $P_5$ is set to a value lower than 4.5V. The voltage which is applied to the region $P_3$ is maintained at 4.5V.

Figure 7:
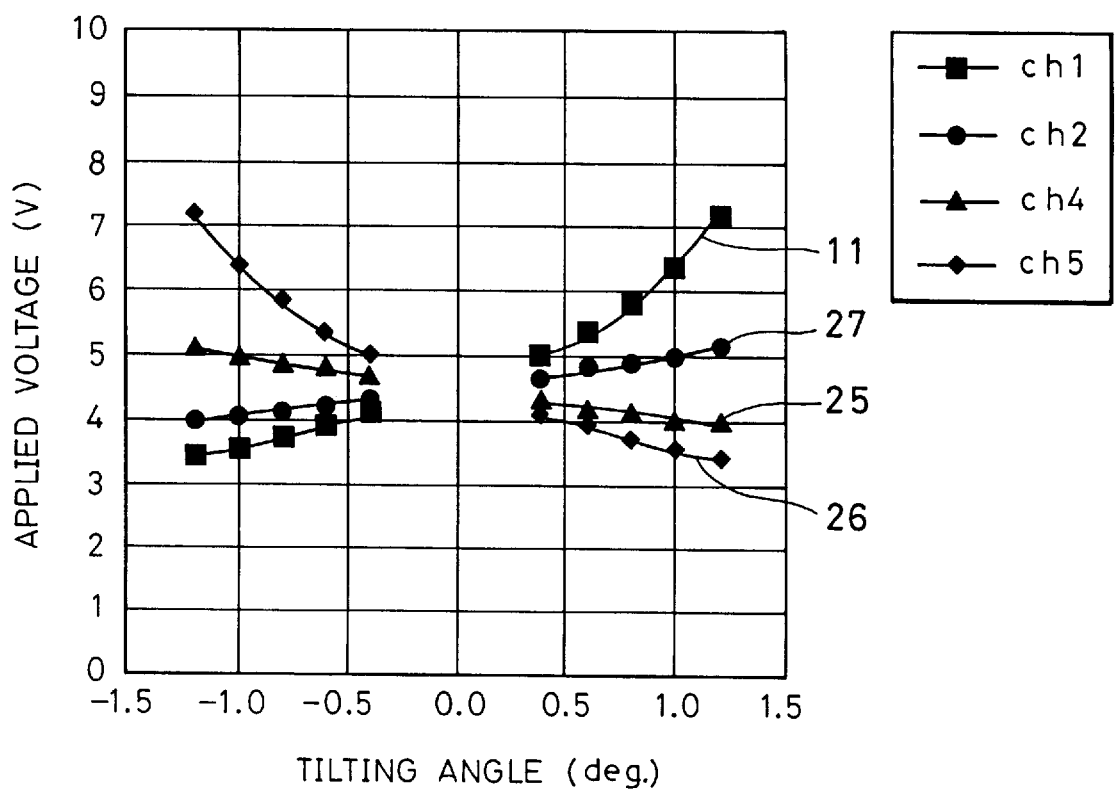
FIG. 7 is a driving voltage characteristics diagram showing the relation between a tilting angle and a driving voltage to drive each of divided regions of the liquid crystal panel in the tilt servo apparatus according to the embodiment of the invention.

The relation between the tilting angle and the driving voltage to drive each of the divided regions of the liquid crystal panel 3 is shown in driving voltage characteristics of FIG. 7. In the diagram, reference numeral 11 shows characteristics of a driving voltage to drive the region corresponding to $P_1$ in FIG. 3 of the liquid crystal panel 3. Similarly, the reference numerals 27 25 and represent characteristics of driving voltages to drive the regions corresponding to $P_2$, $P_4$, and $P_5$, respectively.

As will be understood from the diagram, when the tilt is properly corrected, the driving voltage characteristics have linear driving characteristics in the regions $P_2$ and $P_4$ adjacent to the region $P_3$ arranged in correspondence to the center portion of the objective lens 4. In the regions $P_1$ and $P_5$ arranged in correspondence to the periphery of the objective lens 4, on the other hand, a nonlinear portion is outstanding from a point near the applied voltage exceeding 5V, so that nonlinear driving characteristics are necessary.

The liquid crystal panel driving circuit 9, therefore, decides a magnitude of the driving voltage to drive each of the divided regions of the liquid crystal panel 3 in accordance with a value of an output of the tilt sensor 8 which is detected according to the tilting angle in correspondence with the linear or nonlinear characteristics and generates the formed driving voltage to each of the divided regions.

Figure 6:
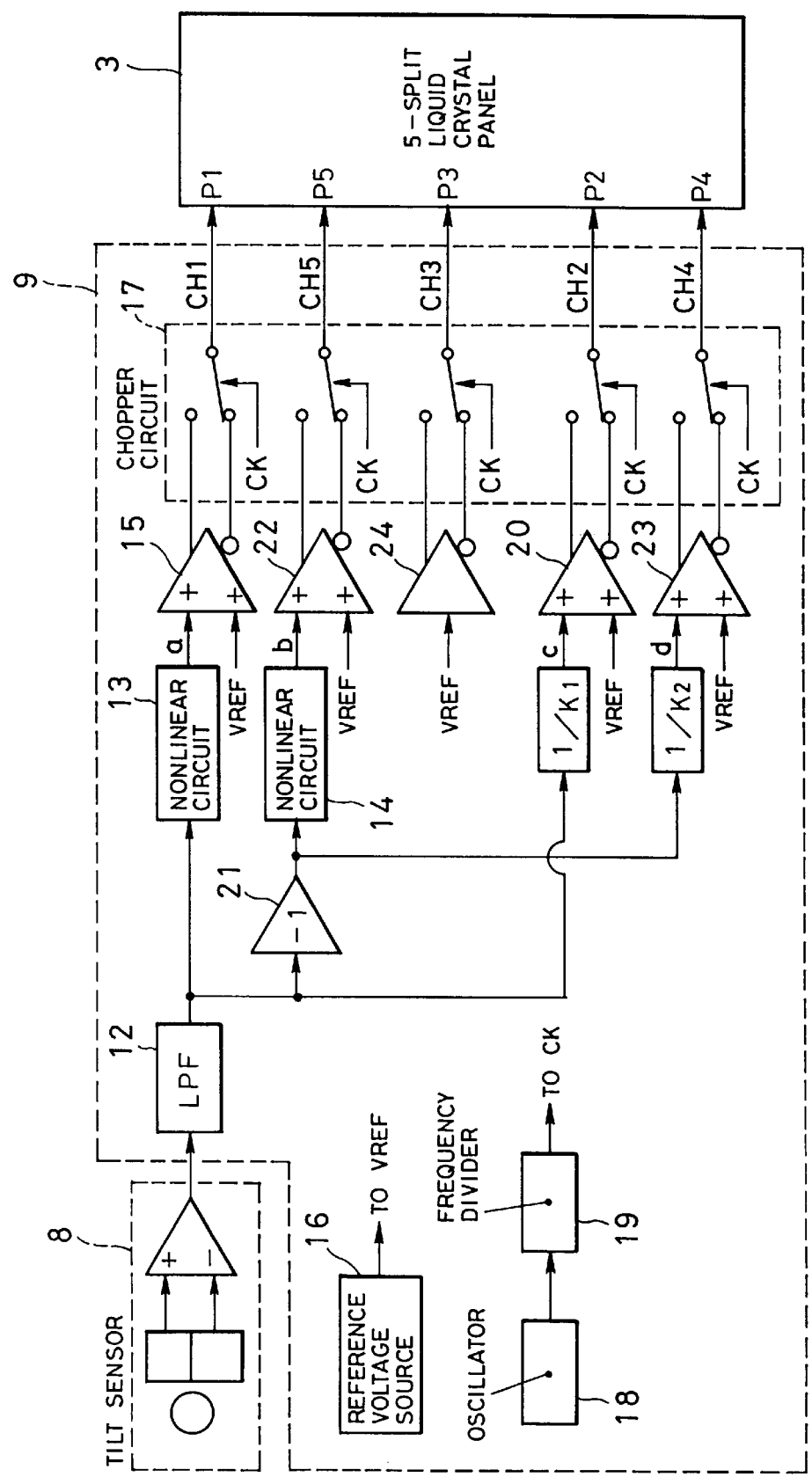
FIG. 6 is a block diagram showing a construction of a liquid crystal panel driving circuit of the tilt servo apparatus according to the embodiment of the invention.

FIG. 6 is a block diagram showing a construction of the liquid crystal panel driving circuit 9.

The liquid crystal panel driving circuit 9 has a reference voltage source 16 comprising a Zener device and the like. The reference voltage source 16 generates a reference voltage VREF (for example, 4.5V). The reference voltage VREF is supplied to adders 15, 20, 22, and 23, respectively. The reference voltage VREF is also supplied to a chopper circuit 17 via a buffer 24.

The liquid crystal panel driving circuit 9 also has an oscillator 18 and a frequency divider 19. The oscillator 18 oscillates at a predetermined oscillating frequency (for example, 1 MHz) and an output signal is supplied to the frequency divider 19. The frequency divider 19 divides the frequency of the signal (for example, into 1/1000), thereby obtaining a frequency (for example, 1 kHz) necessary to drive the liquid crystal. An output CK of the frequency divider is supplied as a clock to the chopper circuit 17.

For example, a tilt error signal as a difference between detection signals from the tilt sensor 8 divided into two portions in the radial direction is supplied to the liquid crystal panel driving circuit 9. The tilt error signal is transmitted through an LPF 12 for passing through a band necessary for the liquid crystal operation, passes through a nonlinear circuit 13, and is supplied as an output (a) to the adder 15.

After an output of the LPF 12 was gain adjusted to 1/K1 times, it is supplied as an output (c) to the adder 20. The output of the LPF 12 is also supplied to an inverting circuit 21 and its polarity is inverted by the inverting circuit 21. After that, it passes through a nonlinear circuit 14 and is supplied as an output (b) to the adder 22. An output of the inverting circuit 21 is gain adjusted to 1/K2 times and is supplied as an output (d) to the adder 23.

Figure 8:
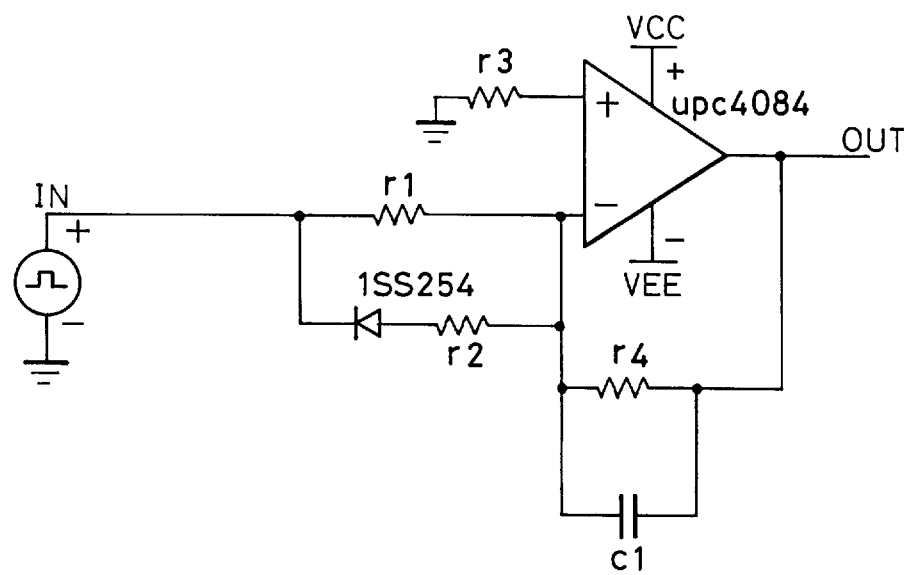
FIG. 8 is a diagram showing an example of a nonlinear circuit provided in the embodiment of the tilt servo apparatus according to the invention.
Figure 9:
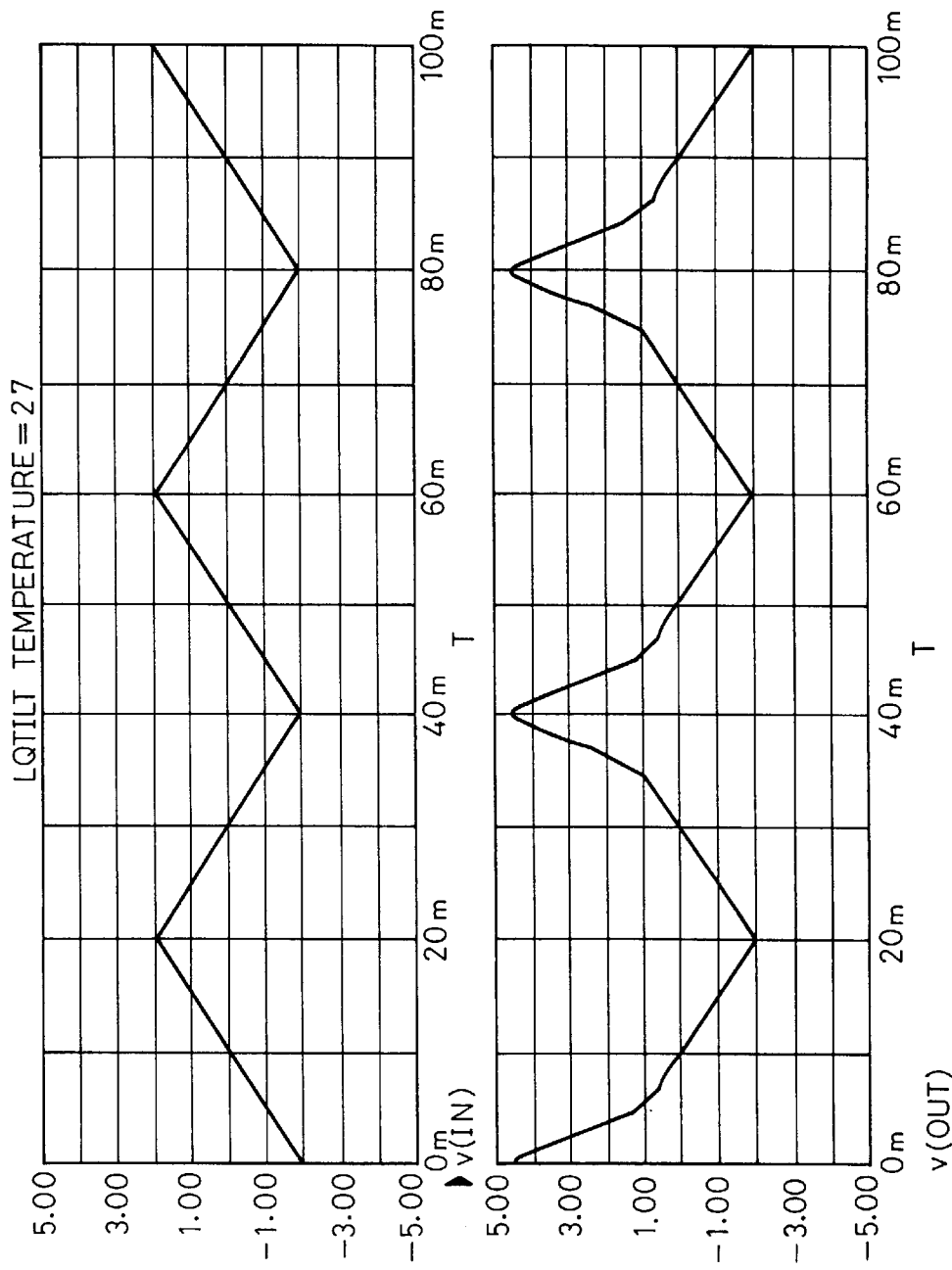
FIG. 9 is a diagram showing input/output characteristics of the example of the nonlinear circuit provided in the embodiment of the tilt servo apparatus according to the invention.

Each of the nonlinear circuits 13 and 14 is constructed by, for example, a nonlinear circuit of an inverting type and an inverting circuit shown in FIG. 8. Each of the circuits has transmitting characteristics corresponding to the driving voltage characteristics of the regions $P_1$ and $P_5$ of the liquid crystal panel 3 shown in FIG. 7 and non-linearly corrects the output of the LPF 12 in accordance with the magnitude of the supplied output of the LPF 12, thereby reducing the phase differences among the outputs (a), (b), (c), and (d) from the adders, thereby allowing the phase of the output of the LPF 12 to approach the phase of the output (reference voltage VREF) of the buffer 24. FIG. 9 shows input/output characteristics of the nonlinear circuit of the inverting type in FIG. 8.

In each of the adders 15, 22, 20, and 23, each of the supplied outputs (a), (b), (c), and (d) is added to the reference voltage VREF and each resultant output is supplied to the chopper circuit 17. In the chopper circuit 17, waveforms of the outputs (a), (b), (c), and (d) and the reference voltage VREF supplied from the adders and buffer are simultaneously shaped to rectangular waveforms by the clock CK and they are sent as driving outputs to drive the corresponding divided regions $P_1$, $P_5$, $P_3$, $P_2$, and $P_4$ of the liquid crystal panel 3 to the liquid crystal panel 3, respectively.

A waveform CH3 of the driving output to drive the region $P_3$ of the liquid crystal panel 3 becomes a rectangular waveform having a frequency of CK and an amplitude of ±VREF(V) (for example, ±4.5 (V)) by the operation of the chopper circuit 17 and becomes a reference of the driving output of the liquid crystal panel 3. Similarly, waveforms CH2 and CH4 of the driving outputs to respectively drive the regions $P_2$ and $P_4$ of the liquid crystal panel 3 become rectangular waveforms having a frequency of CK and amplitudes of ±(c+VREF) (V) and ±(d+VREF) (V) by the operation of the chopper circuit 17 and are amplitude modulation waves in which the frequency of CK is used as a carrier frequency and a signal obtained by adding the reference voltage VREF to the tilt error signal or a signal based on its inversion signal is used as a signal to be modulated.

Waveforms CH1 and CH5 of the driving outputs to drive the regions $P_1$ and $P_5$ of the liquid crystal panel 3 are amplitude modulation waves in which the frequency of CK is used as a carrier frequency and a signal obtained by non-linearly correcting the tilt error signal or a signal based on its inversion signal and adding the reference voltage VREF to each of the non-linearly corrected signals is used as a signal to be modulated.

FIG. 10 shows an example of the driving output waveforms CH1 and CH5 when the optical disc is inclined together with the tilt error signal and a waveform of the output of the LPF 12.

Each of the outputs (a) and (c) has the same phase as that of the tilt error signal and amplitudes of them are set so that the amplitude of the output (a) is larger than that of the output (c). Similarly, the phase of each of the outputs (b) and (d) has a phase opposite to that of the tilt error signal and amplitudes of them are set so that the amplitude of the output (b) is larger than that of the output (d).

The tilt servo apparatus which is used for the optical disc reproducing apparatus according to the embodiment of the invention is constructed as mentioned above. As for the optical pickup 10, even when the optical disc 7 is inclined for the horizontal surface, it is unnecessary to incline the optical pickup 10 itself and to correct the inclination of the optical axis for the information recording surface. Even in case of reproducing the optical disc such as a DVD on which data has been recorded at a high density, the symmetry of the light spots on the phase difference information recording surface of the parallel lights passing through the liquid crystal panel 3 is maintained, the shape of the pit which holds information on the disc is modulated, and the held information can be correctly read.

Since the invention is constructed as mentioned above, the signal corresponding to the tilting angle in the radial direction between the information recording surface of the optical disc and the optical axis of the objective lens is detected by the tilt detecting means, and when the phase difference of the divided portions is adjusted so as to reduce the phase difference of the laser beams passing through the respective divided portions of the liquid crystal panel in correspondence with the detection output obtained, among the divided portions, the divided portions in which the phase difference characteristics are nonlinear are variably driven by performing the process of obtaining linear characteristics via one or a plurality of nonlinear circuits included in the driving circuit, thereby enabling the operation to correct the aberration of the objective lens which is inclined at the tilting angle to be promptly and certainly executed. Since the driving target is the liquid crystal, it can be driven by a low electric power consumption at the time of the tilt servo. A high control response of about 30 Hz can be realized and a search time of the recording information can be shortened.

The preferred embodiment of the present invention has been made. It will be understood that many modifications and variations of the described embodiment will occur to those skilled in the art. It is therefore intended that all of the modifications and variations are within the scope of the appended claims.

What is claimed is:

1. A tilt servo apparatus for use in an optical disc reproducing apparatus having an optical pickup which comprises at least a laser light source, an objective lens, a liquid crystal panel for an aberration correction on which formed is a transparent electrode divided into segments of predetermined shapes, and a photodetector element, and which irradiates a laser beam emitted from said laser light source onto an information recording surface of an optical disc via said liquid crystal panel for the aberration correction and said objective lens, thereby forming a light spot, and receives, at said photo detector element, reflection light being obtained, thereby reading a signal corresponding to information to be recorded on the optical disc, said tilt servo apparatus comprising:

tilt detecting means for detecting a signal representing a tilting angle in a radial direction between the information recording surface of said optical disc and an optical axis of said objective lens; and a driving circuit for variably driving voltages applied to said divided portions of said liquid crystal panel, respectively, said driving circuit performing a driving operation in which predetermined voltages are applied to the respective divided segments of said liquid crystal panel in accordance with a detection output of said tilt detecting means and a phase difference between respective laser beams passing through the divided segments is adjusted, thereby correcting an aberration of said objective lens tilted at the tilting angle with respect to the information recording surface of said optical disc.

2. An apparatus according to claim 1, wherein said driving circuit includes at least a nonlinear circuit and voltages applied to parts of said divided portions of said liquid crystal panel are variably driven through said at least a nonlinear circuit.

\* \* \* \* \*